United States Patent
Duan et al.

(10) Patent No.: US 12,371,343 B1
(45) Date of Patent: Jul. 29, 2025

(54) MANGANESE IRON OXIDE AND PREPARATION METHOD THEREOF, AND PREPARATION METHOD FOR LITHIUM MANGANESE IRON PHOSPHATE CATHODE MATERIALS

(71) Applicant: Kunming University of Science and Technology, Kunming (CN)

(72) Inventors: Jianguo Duan, Kunming (CN); Wenhui Tu, Kunming (CN); Ding Wang, Kunming (CN); Xianshu Wang, Kunming (CN); Peng Dong, Kunming (CN); Yingjie Zhang, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 19/026,692

(22) Filed: Jan. 17, 2025

(30) Foreign Application Priority Data

Jan. 31, 2024 (CN) .......................... 202410134550.6

(51) Int. Cl.
C01G 49/00 (2006.01)

(52) U.S. Cl.
CPC ...... *C01G 49/0072* (2013.01); *C01P 2004/32* (2013.01); *C01P 2004/61* (2013.01); *C01P 2004/80* (2013.01); *C01P 2006/40* (2013.01)

(58) Field of Classification Search
CPC ............. C01G 49/0072; C01P 2004/32; C01P 2004/61; C01P 2004/80; C01P 2006/40
See application file for complete search history.

(56) References Cited

U.S. PATENT DOCUMENTS

| | | | | |
|---|---|---|---|---|
| 2010/0278719 | A1* | 11/2010 | Lambert | C01G 49/0072 423/579 |
| 2024/0400408 | A1* | 12/2024 | Wang | H01M 4/381 |

FOREIGN PATENT DOCUMENTS

| CN | 102328960 A | | 1/2012 |
|---|---|---|---|
| CN | 103137972 A | | 6/2013 |
| CN | 105470495 A | * | 4/2016 |
| CN | 108461243 A | | 8/2018 |
| CN | 114014369 A | | 2/2022 |
| CN | 116285996 A | * | 6/2023 |
| CN | 116969435 A | * | 10/2023 |

OTHER PUBLICATIONS

Hailiang Wan, et al., LiMn1-xFexPO4 Nanorods Grown on Graphene Sheets for Ultrahigh-Rate-Performance Lithium Ion Batteries, Angew. Chem. Int. Ed., 2011, pp. 7364-7368, vol. 50.

Wen Liu, et al., Fabrication of high tap density LiFe0.6Mn0.4PO4/C microspheres by a double carbon coating-spray drying method for high rate lithium ion batteries, J. Mater. Chem. A, 2013, pp. 2411-2417, vol. 1.

Liangtao Yang et al., Concentration-gradient LiMn0.8Fe0.2PO4 cathode material for high performance lithium ion battery, Journal of Power Sources, 2016, pp. 293-300, vol. 304.

Liying Liu, et al., Nanocomposites LiMnxFe1-xPO4/C synthesized via freeze drying assisted sol-gel routine and their magnetic and electrochemical properties, Journal of Alloysand Compounds, 2019, pp. 339-346, vol. 779.

Wenchao Yang, et al., LiMn0.8Fe0.2PO4/C cathode material synthesized via co-precipitation method with superior high-rate and low-temperature performances for lithium-ion batteries, Journal of PowerSources, 2015, pp. 785-791, vol. 275.

* cited by examiner

Primary Examiner — Muhammad S Siddiquee
(74) Attorney, Agent, or Firm — Bayramoglu Law Offices LLC

(57) ABSTRACT

A manganese iron oxide and a preparation method thereof, and a preparation method for lithium manganese iron phosphate cathode materials are provided. The preparation method for the manganese iron oxide includes the following steps: Configuring a mixed salt solution containing the first complexing agent, antioxidant, manganese salt, and iron salt; mixing the mixed salt solution, the second complexing agent, oxidant and deionized water to undergo a complexation-oxidation-precipitation reaction, filtering, washing, and drying a precipitate obtained after the reaction to obtain a manganese iron oxide. The preparation methods for the manganese iron oxide and lithium manganese iron phosphate cathode materials are simple, the physical and chemical indexes of the product are controllable, the raw materials are easy to obtain, the cost is low, the reaction conditions are mild, the corrosion resistance requirements of the equipment are not high, the technical difficulty is low, and it is easy to scale production.

20 Claims, 14 Drawing Sheets

MANGANESE IRON OXIDE AND PREPARATION METHOD THEREOF, AND PREPARATION METHOD FOR LITHIUM MANGANESE IRON PHOSPHATE CATHODE MATERIALS

CROSS REFERENCE TO THE RELATED APPLICATIONS

This application is based upon and claims priority to Chinese Patent Application No. 202410134550.6, filed on Jan. 31, 2024, the entire contents of which are incorporated herein by reference.

TECHNICAL FIELD

The invention relates to the field of lithium battery, specifically, a manganese iron oxide and a preparation method thereof, and a preparation method for lithium manganese iron phosphate cathode materials.

BACKGROUND

Olivine-type lithium manganese iron phosphate ($LiMn_{1-x}Fe_xPO_4/C$) is considered to be one of the ideal cathode materials for energy storage/power batteries due to its stable lattice structure, high theoretical specific capacity (171 mAh/g), excellent safety performance, abundant raw material sources, and environmental friendliness. However, the low electronic and ionic conductivity directly limits its large-scale application.

The insulation of $LiMn_{1-x}Fe_xPO_4/C$ has put forward strict requirements for $LiMn_{1-x}Fe_xPO_4/C$ cathode materials, such as high crystallinity, particle nanocrystallization, and uniform conductive network construction, resulting in no mature industrialization route so far. Currently, the preparation methods of lithium manganese iron phosphate reported in the literature mainly include high-temperature solid phase synthesis (J. Mater. Chem. A, 2013,1 (7):2411-2417), water/solvothermal synthesis (Journal of Power Sources, 2016,304:293-300), sol-gel synthesis (Journal of Alloys and Compounds, 2019,779:339-346), co-precipitation synthesis (Journal of PowerSources, 2015,275:785-791), etc. The high-temperature solid phase synthesis method is considered to be the most suitable for large-scale industrial production due to its simple process, low cost and high yield, however, the morphology of the product is uncontrollable, and it is difficult to obtain uniform nanoparticles; the water/solvothermal synthesis method can control the morphology of the material, and the material has good crystallization, few lattice defects, and high purity, however, the disadvantages of this method are high temperature and high pressure synthesis, high risk coefficient, and difficulties in mass production; the precursor solution prepared by the sol-gel method has good chemical uniformity, low gel heat treatment temperature, small and uniform powder particle size, easy control of the reaction process, simple equipment and so on; however, the drying shrinkage of the material is large when the sol-gel method is used, and the production cycle is long, the difficulty of industrialization is relatively large; the co-precipitation process is simple, the calcination temperature is low and the time is short, and the product performance is good, however, the operating conditions are harsh, such as precipitation and filtration are relatively difficult, and the purity of the product is not high, and it is easy to generate impurity phases, which makes it difficult to achieve industrial production. Therefore, it is particularly critical to explore a suitable preparation method for lithium manganese iron phosphate materials.

SUMMARY

In view of the shortcomings of the existing technology, one of the purposes of the invention is to solve one or more problems existing in the existing technology. For example, one of the purposes of the invention is to provide a preparation method for lithium manganese iron phosphate cathode materials with simple operation, controllable physical and chemical indicators of the product, and easy to scale production.

On the one hand, the invention provides a manganese iron oxide, the manganese iron oxide is composed of spherical or quasi-spherical secondary particles, the secondary particles are formed by an aggregation of primary particles in a form of flakes, a chemical formula of manganese iron oxide can be $Mn_{3-x}Fe_xO_4$, where $0<x<3$.

Furthermore, a secondary particle size can be 1 μm-15 μm; a molar ratio of manganese to iron can be (1-99):1.

On the other hand, the invention provides a method for preparing the manganese iron oxide, including the following steps: configuring a mixed salt solution containing a first complexing agent, antioxidant, manganese salt and iron salt; mixing the mixed salt solution, a second complexing agent, oxidant and deionized water to undergo a complexation-oxidation-precipitation reaction to an end of the reaction, filtering, washing, and drying a precipitate obtained after the reaction to obtain a manganese iron oxide.

Furthermore, a sum of a concentration of manganese and iron in the mixed salt solution can be 0.5 mol/L-2 mol/L.

Furthermore, the first complexing agent can be at least one of ethylenediaminetetraacetic acid disodium, ammonia chloride, diethanolamine, and diethylenetriamine, an additional amount of the first complexing agent can be 0.1-10% of a total amount of manganese and iron.

Furthermore, the second complexing agent can be at least one of ethylenediaminetetraacetic acid (EDTA), ammonia, and citric acid.

Furthermore, when mixing the mixed salt solution, the second complexing agent, oxidant, and deionized water, a feed rate of the second complexing agent is recorded as 0.2-5 times a molar flow rate of a manganese iron mixed salt solution; a pH value of a reaction system can be 8.0-11.0, a reaction temperature can be 30° C.-90° C., a reaction time can be 8 h-100 h and a concentration of the second complexing agent can be 1 mol/L-14 mol/L.

Furthermore, the iron salt can be at least one of $FeSO_4 \cdot 7H_2O$, $FeSO_4$, $Fe_2(SO_4)$, $FeCl_2$, $FeCl_2 \cdot 4H_2O$ and iron acetate; the manganese salt can be at least one of $MnSO_4$, $MnSO_4 \cdot H_2O$, $Mn(NO_3)_2$, $MnCl_2$, $MnCl_2 \cdot 4H_2O$ and manganese acetate; the antioxidant can be at least one of ascorbic acid, citric acid, and vitamin C, and a mass of the antioxidant can be 0.1-0.2% of a total mass of manganese salt and iron salt, the oxidant can be at least one of $O_2$, $H_2O_2$, and air.

On the other hand, the invention provides a preparation method for lithium manganese iron phosphate cathode materials, including the following steps: mixing the above manganese iron oxide with lithium source, phosphorus source, and carbon source, and calcining in an inert atmosphere to obtain a carbon-coated lithium manganese iron phosphate cathode material.

Furthermore, calcination can include heat preservation at 300° C.-400° C. for 3 h-10 h and then calcining at 600° C.-800° C. for 5 h-10 h; the lithium source is at least one of LiOH, LiNO$_3$, Li$_2$CO$_3$ and LiH$_2$PO$_4$, the phosphorus source can be at least one of LiH$_2$PO$_4$, H$_3$PO$_4$, and NH$_4$H$_2$PO$_4$, the carbon source can be at least one of starch, polyvinyl alcohol (PVA), sucrose, citric acid, glucose.

Furthermore, a stoichiometric ratio of each substance in the mixture can be Mn+Fe:Li:P=(0.95-1):(0.95-1.05):(0.95-1.05); an amount of carbon source added is a sum of an atomic weight of manganese and iron, 1 mol of manganese and iron can be added to 5-30 g of carbon source.

Compared with the existing technology, the beneficial effects of the invention include the following items:

(1) The preparation methods for the manganese iron oxide and the lithium manganese iron phosphate cathode material of the invention are simple, the physical and chemical indexes of the product are controllable, the raw materials are easy to obtain, the cost is low, the reaction conditions are mild, the equipment corrosion requirements are not high, the process is simple, the technical difficulty is low, and the scale production is easy;

(2) The manganese iron oxide of the invention has the advantages of nano-sheet morphology of primary particles, high sphericity of secondary particles, large specific surface area, high crystallinity, high purity, low impurity content, and strong reactivity. The prepared carbon-coated lithium manganese iron phosphate cathode material has the advantages of high tap density, good processing performance, and excellent electrochemical performance.

(3) The controllable preparations of manganese iron oxides and cathode materials can be realized by adjusting the synthesis time, the complexing agent concentration, or the reaction temperature, which can meet the controllable production of products with different performance requirements in the market.

BRIEF DESCRIPTION OF THE DRAWINGS

The above and other purposes and characteristics of the invention will become clearer by the following description in combination with the attached figures, where.

DETAILED DESCRIPTION OF THE EMBODIMENTS

In the following, the manganese iron oxide and the preparation method thereof, and the preparation method for the lithium manganese iron phosphate cathode material are described in detail according to the invention in combination with the attached figures and the examples.

Figure 2:
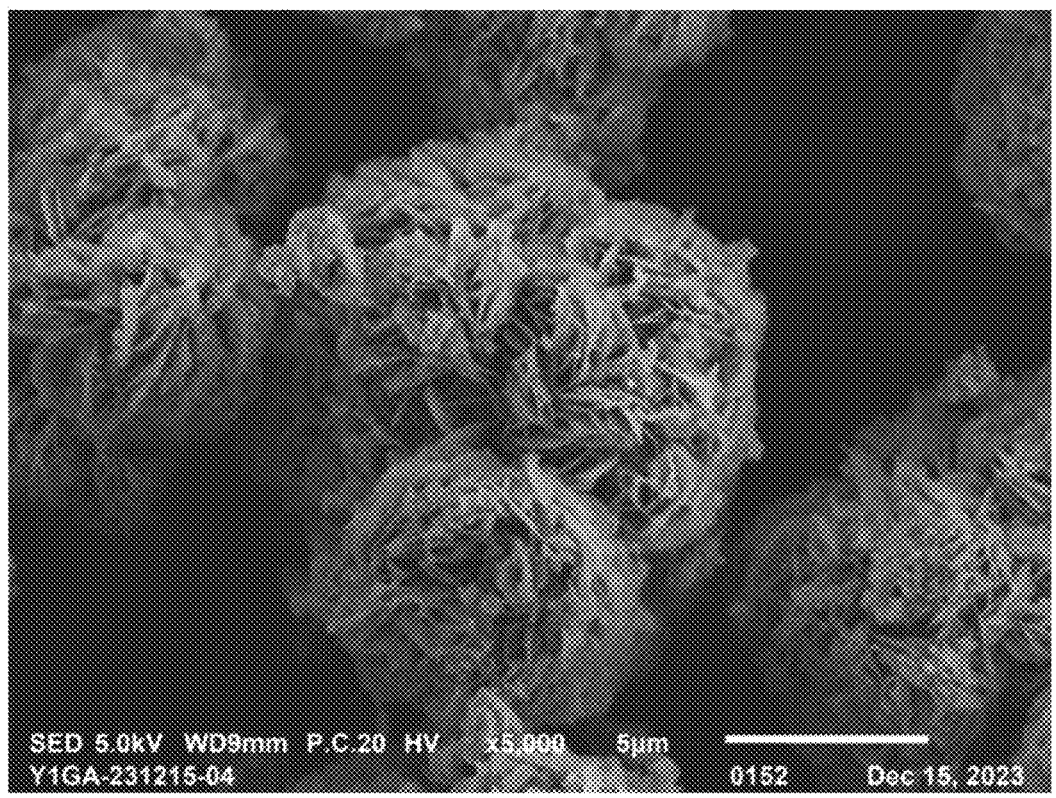
FIG. 2 is a SEM image of the manganese iron oxide prepared by Example 1.

One aspect of the invention provides a manganese iron oxide. In some embodiments, as shown in FIG. 2, the manganese iron oxide is composed of spherical or quasi-spherical secondary particles, and the secondary particles are formed by an aggregation of primary particles in a form of flakes. The primary particles of the nanosheet morphology aggregate into secondary particles, which gives the secondary particles the advantages of high sphericity, large specific surface area, and strong reactivity. The chemical formula of the manganese iron oxide can be Mn$_{3-x}$Fe$_x$O$_4$, where, 0<x<3.

In some implementation schemes, the secondary particle size can be 1 μm-15 μm. The secondary particle size in the above range can make the material have good tap density. For example, the secondary particle size can be 2 μm-14 μm, 4 μm-11 μm, 6 μm-9 μm, 7 μm-8 μm or more.

In some implementation schemes, the molar ratio of manganese to iron can be (1-99):1. For example, the molar ratio of manganese to iron can be (5-80):1, (17-72):1, (24-61):1, (36-52):1, (40-49):1 or more.

On the other hand, the invention provides a preparation method for the manganese iron oxide. In some implementation schemes, the following steps can be included:

S01, a mixed salt solution containing the first complexing agent, antioxidant, manganese salt, and iron salt is prepared.

S02, the mixed salt solution, the second complexing agent, oxidant, and deionized water are mixed to undergo a complexation-oxidation-precipitation reaction to the end of the reaction, the precipitate obtained after the reaction is filtered, washed, and dried to obtain the manganese iron oxide. The above-mentioned complexation-oxidation-precipitation reaction can include Mn$^{2+}$, Fe$^{2+}$, and a complexing agent to synthesize a complex, which is oxidized to Mn$^{3+}$, Mn$^{4+}$, and Fe$^{3+}$ by oxidant, and then slowly complex and precipitate Mn$_{3-x}$Fe$_x$O$_4$.

In some implementation schemes, the first complexing agent may be at least one of disodium ethylenediamine tetraacetate, ammonia chloride, diethanolamine, and diethylenetriamine.

In some implementation schemes, the addition amount of the first complexing agent can be 0.1-10% of the total amount of manganese and iron substances. The addition amount of the first complexing agent is controlled within the range of 10%, which can avoid the metal loss caused by incomplete oxidation during the second step of oxidation precipitation due to the excessive addition of the first complexing agent. For example, the addition amount of the first complexing agent can be a combination of 0.5-8.6%, 1.6-7.3%, 3.1-6.5%, 4.5-6.0%, 4.8-5.4% or more of the total amount of manganese and iron substances.

In some implementation schemes, the antioxidant can be at least one of ascorbic acid, citric acid, and vitamin C.

In some implementation schemes, the mass of antioxidants can be 0.1-0.2% of the total mass of manganese and iron complexes. For example, the antioxidant mass can be a combination of 0.1-0.2%, 0.15-0.18%, 0.12-0.16% or more of the total mass of the manganese iron complex.

In some implementation schemes, the manganese salt may be at least one of $MnSO_4$, $MnSO_4 \cdot H_2O$, $Mn(NO_3)_2$, $MnCl_2$, $MnCl_2 \cdot 4H_2O$, and manganese acetate.

In some implementation schemes, the iron salt may be at least one of $FeSO_4 \cdot 7H_2O$, $FeSO_4$, $Fe_2(SO_4)$, $FeCl_2$, $FeCl_2 \cdot 4H_2O$, and iron acetate.

In some implementation schemes, the sum of the concentration of manganese and iron in the mixed solution of manganese and iron can be 0.5 mol/L-2 mol/L. In the above concentration range, the manganese iron oxide can be controlled to have a suitable nucleation rate, uniform particle distribution and size, and a suitable tap density. If the sum of the concentration is greater than 2 mol/L, the nucleation rate will increase, the particle distribution will be uneven, the particle size will decrease, and thereby decreasing the tap density. For example, the concentration of manganese and iron in the mixed solution of manganese and iron is 0.5 mol/L-2 mol/L, 0.7 mol/L-1.8 mol/L, 0.9 mol/L-1.5 mol/L, 1.2 mol/L-1.4 mol/L or above.

In some embodiments, the second complexing agent can be at least one of EDTA, ammonia, and citric acid.

In some implementation schemes, the complexation-oxidation-precipitation reaction occurs when the mixed salt solution, the second complexing agent, and the oxidant are simultaneously added to the reactor containing deionized water. When the mixed salt solution, the second complexing agent, oxidant, and deionized water are mixed, the feed rate of the second complexing agent can be 0.2-5 times the molar flow rate of the mixed salt solution of manganese and iron. For example, the feed flow rate of mixed salt solution can be 2 mL/min-30 mL/min, the flow rate of the second complexing agent can be 0.5 mL/min-10 mL/min, and the flow rate of oxidant can be 100 mL/min-1000 mL/min. For example, the feed flow rate of mixed salt solution can be 7 mL/min-21 mL/min, the flow rate of the second complexing agent can be 2.7 mL/min-8.1 mL/min, and the flow rate of oxidant can be 300 mL/min-800 mL/min.

In some implementation schemes, the pH value of the system in the complexation-oxidation-precipitation reaction process can be maintained at 8.0-11.0 by adding an alkaline solution, such as adding 1 mol/L-10 mol/L NaOH.

In some implementation schemes, the reaction temperature of the complexation-oxidation-precipitation reaction can be 30° C.-90° C., the reaction time can be 8 h-100 h, and the concentration of the second complexing agent can be 1 mol/L-14 mol/L. The reasons for setting the above reaction temperature, reaction time, and the second complexing agent are as follows: The temperature selection mainly considers the controllable level operation efficiency of the preparation process conditions, and the reaction is slow and impractical below 30° C.; when the temperature is higher than 90° C., it has higher requirements of equipment, the reaction is too fast to control; the reaction time mainly takes into account the production efficiency and the need for crystal growth, when the reaction time is less than 8 h, the crystallization will be incomplete, the particles will be too fine, the yield will be reduced when the reaction time is more than 100 h, and the product will be aged and recrystallized. For example, when the concentration of the second complexing agent is less than 1 mol/L, the amount of wastewater is huge and meaningless, and 14 mol/L is the solubility limit of the selected second complexing agent. For example, in some implementation schemes, the reaction temperature of complexation-oxidation-precipitation reaction can be 40° C.-80° C., the reaction time can be 18 h-80 h, the concentration of the second complexing agent can be 3 mol/L-11 mol/L, or the reaction temperature can be 52° C.-71° C., the reaction time can be 30 h-68 h, the concentration of the second complexing agent can be 5 mol/L-9 mol/L.

In some implementations, the oxidant is at one of $O_2$, $H_2O_2$, and the air.

In some implementations, washing in S02 can adopt water washing, the water washing adopts 30° C.-90° C. deionized water, washing 3-8 times. The drying temperature after washing can be 50° C.-160° C., and the drying time can be 10 h-30 h. For example, the drying temperature can be 120° C., and the drying time can be 20 h.

On the other hand, the invention provides a preparation method for the lithium manganese iron phosphate cathode materials. In some implementation schemes, the preparation methods can include that the manganese iron oxide or the manganese iron oxide prepared by the above preparation method is mixed with a lithium source, phosphorus source, and carbon source, and calcined in an inert atmosphere to obtain carbon-coated lithium manganese iron phosphate cathode material.

In some embodiments, the lithium source can be at least one of LiOH, $LiNO_3$, $Li2CO_3$, and $LiH_2PO_4$, the phosphorus source can be at least one of $LiH_2PO_4$, $H_3PO_4$ and $NH_4H_2PO_4$, the carbon source can be at least one of starch, PVA, sucrose, citric acid, and glucose. Of course, the lithium source, phosphorus source, and carbon source of the invention are not limited to this, and other lithium salts, phosphorus sources, and carbon sources are available.

In some implementation schemes, the stoichiometric ratio of each substance in the mixture can be manganese+iron:lithium:phosphorus=(0.95-1):(0.95-1.05):(0.95-1.05).

According to the above stoichiometric ratio, the chemical formula can be obtained as $LiMn_{1-y}Fe_yPO_4/C$ composite cathode material. That is, the carbon-coated $LiMn_{1-y}Fe_yPO_4$ composite cathode material, where $0<y<1$.

In some implementation schemes, the amount of carbon source added can be recorded as the sum of the atomic weight of manganese and iron, and 5 g-30 g of carbon source is added to 1 mol of manganese and iron. For example, 1 mol of manganese and iron added to the carbon source quality can be 8 g-28 g, 10 g-25 g, 13 g-21 g, 17 g-19 g, or more range of combination.

In some implementation schemes, the manganese iron oxide can be mixed with lithium sources, phosphorus sources, and carbon sources by ball milling. The ball milling time can be 3 h-6 h, and the ratio of ball to material=(9:1)-(40:1). The ball milling medium can be a stainless steel ball or a zirconia ball. Ball milling dispersant can be ethanol or deionized water. After ball milling, it is dried and then calcined. The drying temperature can be 40° C.-90° C., and the drying time can be 12 h-26 h.

In some implementation schemes, the inert atmosphere can be at least one of argon and nitrogen.

In some implementation schemes, the calcination can include heat preservation at 300° C.-400° C. for 3 h-10 h and then calcining at 600° C.-800° C. for 5 h-10 h to obtain the $LiMn_{1-y}Fe_yPO_4/C$ composite cathode material (lithium manganese iron phosphate cathode material).

In order to better understand the invention, the following is combined with specific examples to further clarify the content of the invention, but the content of the invention is not limited to the following examples.

Example 1

A preparation method for the lithium manganese iron phosphate cathode material includes the following steps:
Step 1, 20486.939 g of $MnSO_4 \cdot H_2O$ and 340.408 g of $FeSO_4 \cdot 7H_2O$ are weighed to prepare 60 L of 2 mol/L Mn, Fe metal mixed salt solution, Mn:Fe=99:1, 45.1488 g of ethylenediamine tetraacetic acid disodium is added as the first complexing agent, 30.699 g of ascorbic acid is added as antioxidant, and stirred evenly;
Step 2, $O_2$ is introduced into the reactor, and the mixed salt solution of manganese and iron and EDTA are added into the reactor containing deionized water, the pH value of the reaction system is controlled to be 8.0 with 1 mol/L NaOH solution, and the reaction temperature is 30° C., after the reaction, the precipitate is filtered and washed 8 times with deionized water at 30° C., and the filter cake is collected, the filter cake is placed in a blast drying oven at 50° C. for 30 h, and then the material is taken out and sieved to obtain the manganese iron oxide powder;
Step 3, 10 g of manganese iron oxide powder is weighed according to the stoichiometric ratio:manganese+iron: lithium:phosphorus=1:1.05:0.95, 10.8370 g of $LiH_2PO_4$ is added as phosphorus source and lithium source, 0.4055 g of $Li_2CO_3$ is added as lithium source, 0.55 g of sucrose is added as the organic carbon source, 40 mL of ethanol is added as dispersant, the ratio of ball to material is 9:1, the ball milling medium is stainless steel ball, the ball milling time is 3 h, the slurry after ball milling is processed by blast drying at 40° C. for 26 h and sieved;
Step 4, the mixed powder obtained in Step (3) is placed in a magnesium oxide crucible, and then placed in a tube furnace, under an argon atmosphere, it is heated to 300° C. and held for 10 h for pre-sintering, and then heated to 600° C. for calcination for 10 h, after cooling to 25° C. with the furnace, the nano-$LiMn_{0.99}Fe_{0.01}PO_4$ cathode material is obtained.

Figure 1:
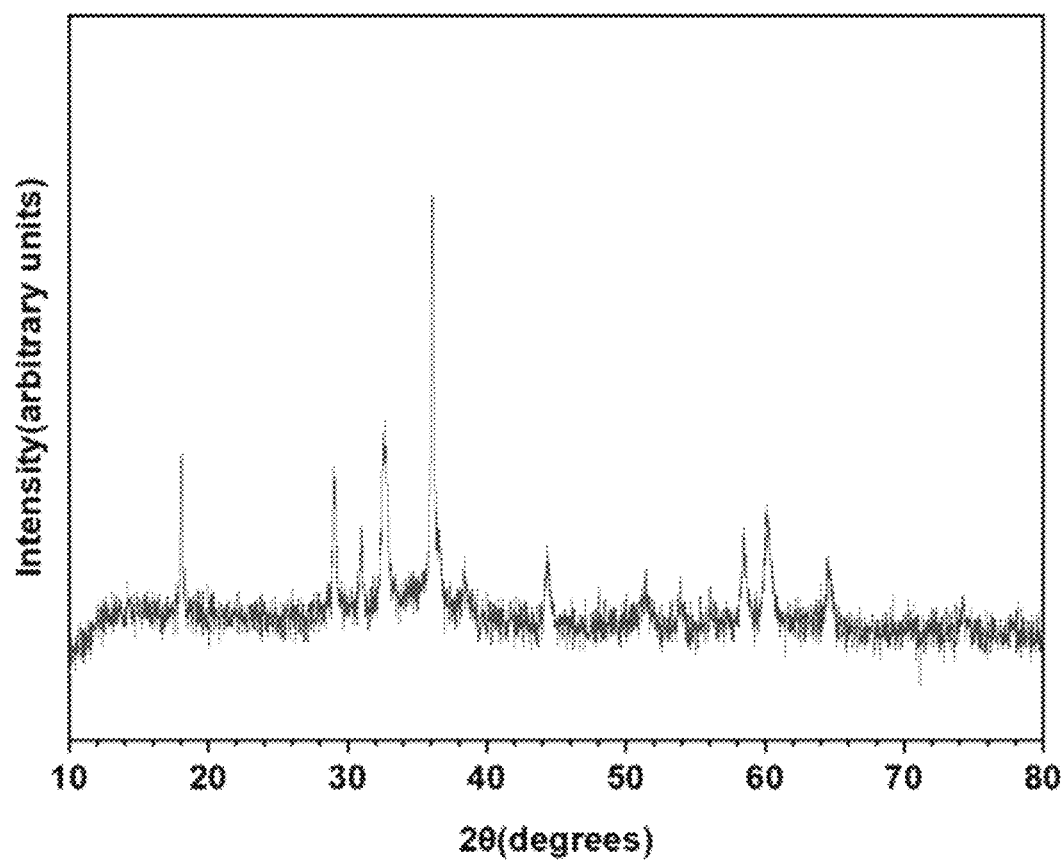
FIG. 1 is an XRD pattern of the manganese iron oxide prepared by Example 1.

The prepared manganese iron oxide is tested by XRD, and the test results are shown in FIG. 1, it can be seen from the figure that the crystallinity of the synthesized material is better.

The prepared manganese iron oxide is tested by SEM, and the test results are shown in FIG. 2, it can be seen from the figure that the synthesized material presents a spherical or quasi-spherical morphology, it is a secondary particle composed of nano-flakes with a primary morphology.

Figure 3:
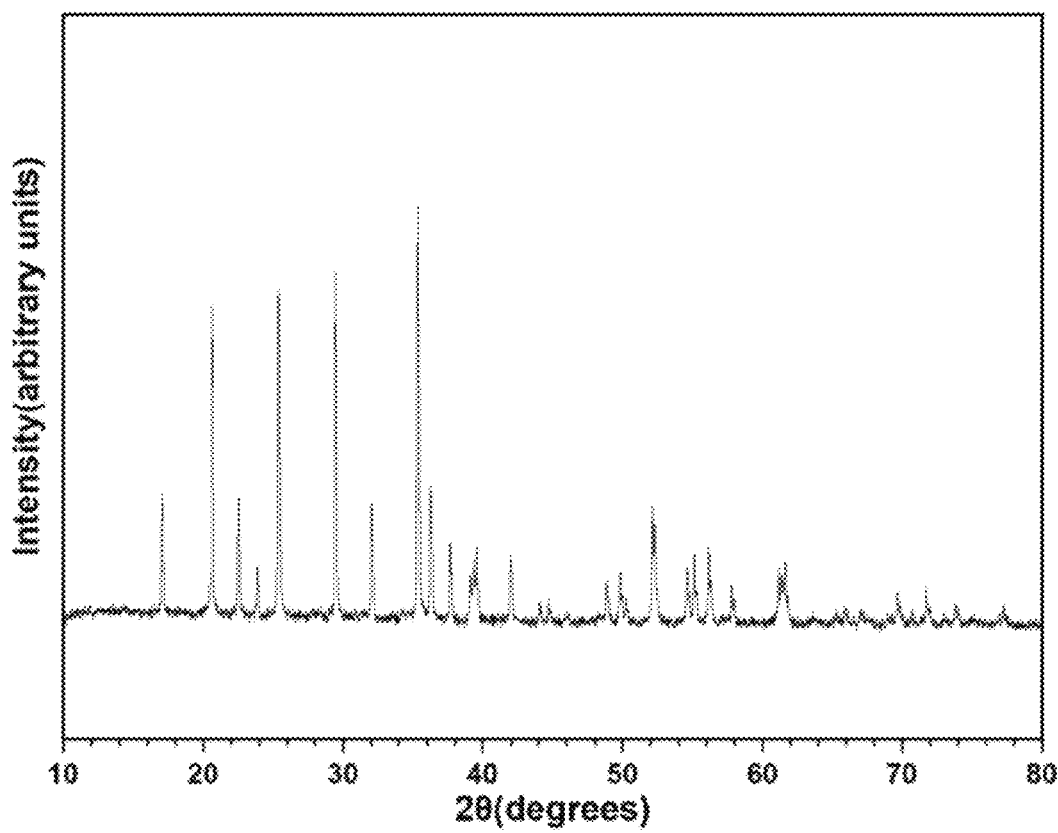
FIG. 3 is an XRD pattern of the lithium manganese iron phosphate cathode material prepared by Example 1.

The prepared lithium manganese iron phosphate cathode material is tested by XRD, and the test results are shown in FIG. 3, it can be seen from the figure that the synthesized material is pure-phase lithium manganese iron phosphate with good crystallinity.

Figure 4:
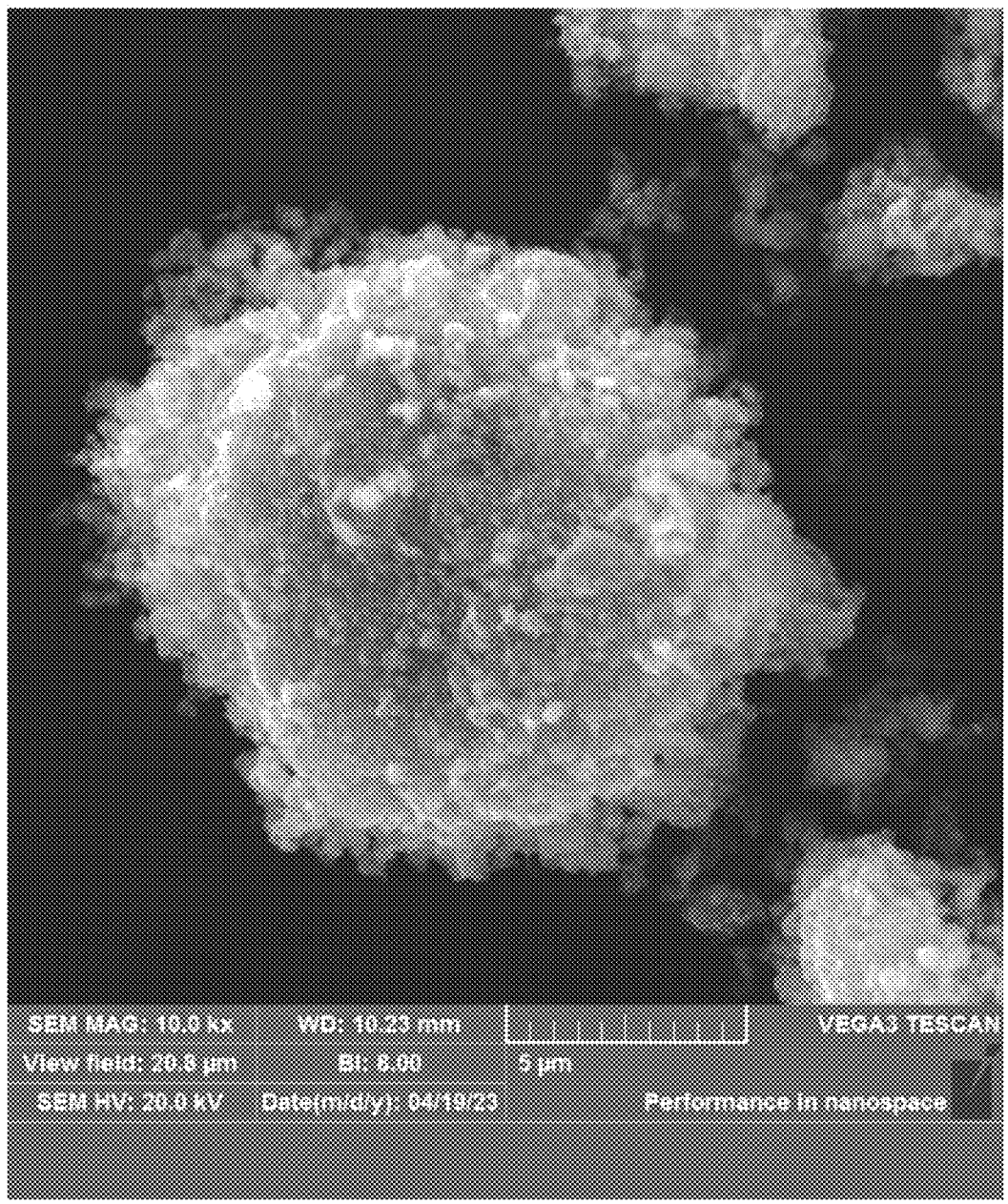
FIG. 4 is an SEM image of the lithium manganese iron phosphate cathode material prepared by Example 1.

The prepared lithium manganese iron phosphate cathode material is tested by SEM, and the test results are shown in FIG. 4, it can be seen from the figure that the morphology of lithium manganese iron phosphate particles is spherical and the particle size is nanoscale.

The electrochemical performance of the prepared lithium manganese iron phosphate is tested, the material had a discharge specific capacity of 150.2 mAh/g at 0.1 C rate, and the performance is excellent.

Example 2

A preparation method for the lithium manganese iron phosphate cathode material includes the following steps:
Step 1, 3697.9592 g of $MnSO_4$ and 2481.6327 g of $FeSO_4$ are weighed to prepare 40 L of 1 mol/L Mn, Fe metal mixed salt solution, Mn:Fe=6:4, 84.112 g of diethanolamine is added as the first complexing agent, 9.2694 g of ascorbic acid is added as an antioxidant, and stirred evenly;
Step 2, $H_2O_2$ is introduced into the reactor, and the mixed salt solution of manganese and iron and citric acid are added into the reactor containing deionized water, the pH value of the reaction system is controlled to be 9.0 with 5 mol/L NaOH solution, and the reaction temperature is 70° C., after the reaction, the precipitate is filtered and washed 5 times with deionized water at 60° C., and the filter cake is collected, the filter cake is placed in a blast drying oven at 90° C. for 20 h, and then the material is taken out and sieved to obtain the manganese iron oxide powder;
Step 3, 10 g of manganese iron oxide powder is weighed according to the stoichiometric ratio: manganese+iron: lithium:phosphorus=1:1:1, 12.18268 g of $LiH_2PO_4$ is added as phosphorus source and lithium source, 1.75 g of PVA is added as lithium source, 40 mL of ethanol is added as dispersant, the ratio of ball to material is 20:1, the ball milling medium is stainless steel ball, the ball milling time is 4 h, the slurry after ball milling is processed by blast drying at 50° C. for 20 h and sieved;
Step 4, the mixed powder obtained in Step (3) is placed in a magnesium oxide crucible, and then placed in a tube furnace, under an argon atmosphere, it is heated to 350° C. and held for 6 h for pre-sintering, and then heated to 700° C. for calcination for 6 h, after cooling to 25° C. with the furnace, the nano-$LiMn_{0.60}Fe_{0.40}PO_4$ cathode material is obtained.

Figure 5:
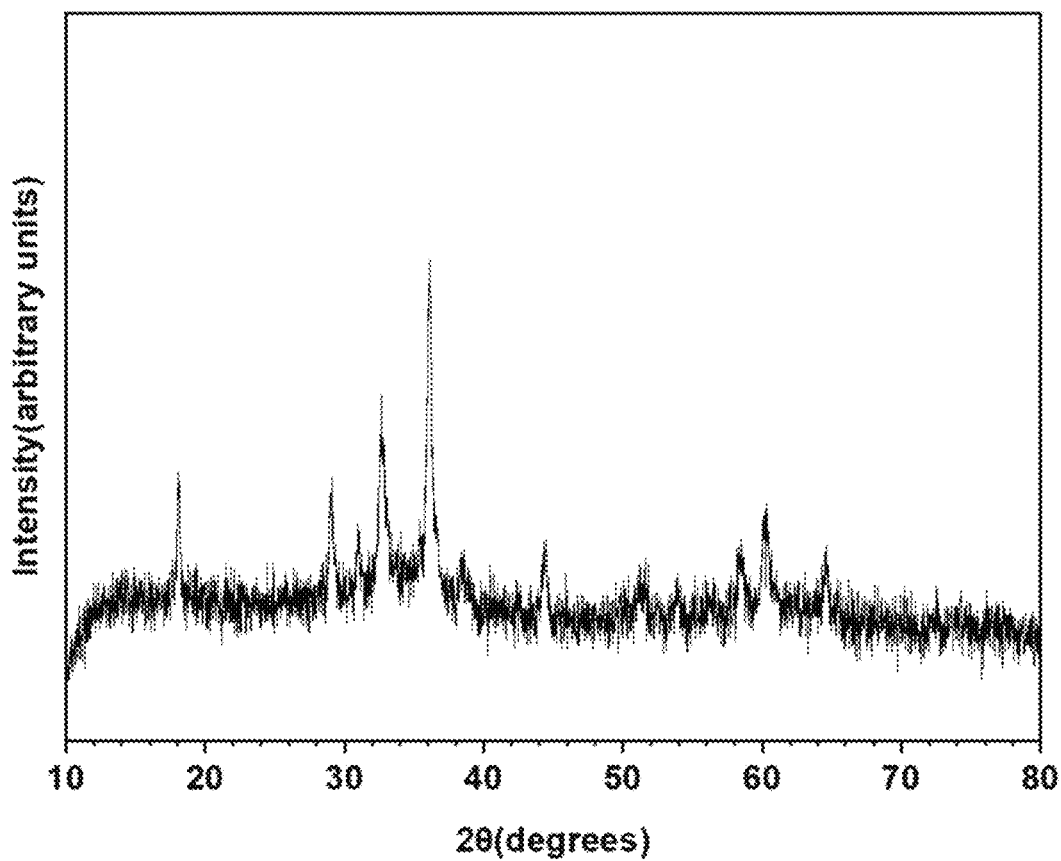
FIG. 5 is an XRD pattern of the manganese iron oxide prepared by Example 2.

The prepared manganese iron oxide is tested by XRD, and the test results are shown in FIG. 5, it can be seen from the figure that the crystallinity of the synthesized material is better.

Figure 6:
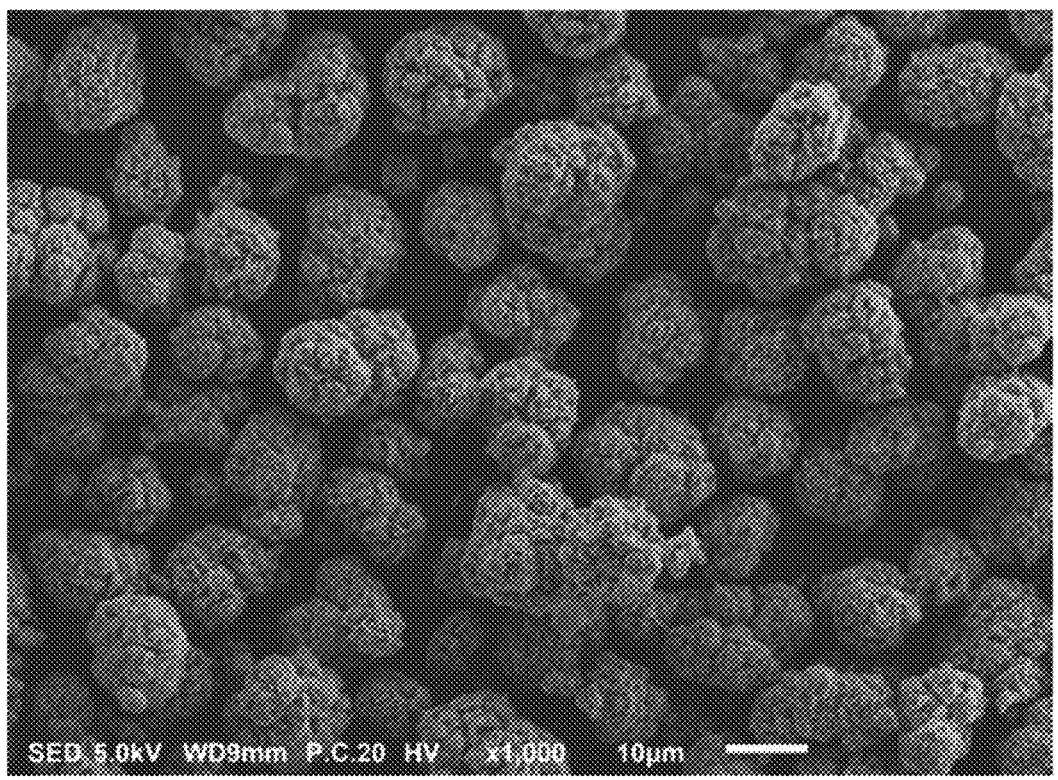
FIG. 6 is a SEM image of the manganese iron oxide prepared by Example 2.

The prepared manganese iron oxide is subjected to an SEM test, and the test results are shown in FIG. 6, it can be seen from the figure that the secondary particle morphology of the synthesized material is spherical and the size is micron.

Figure 7:
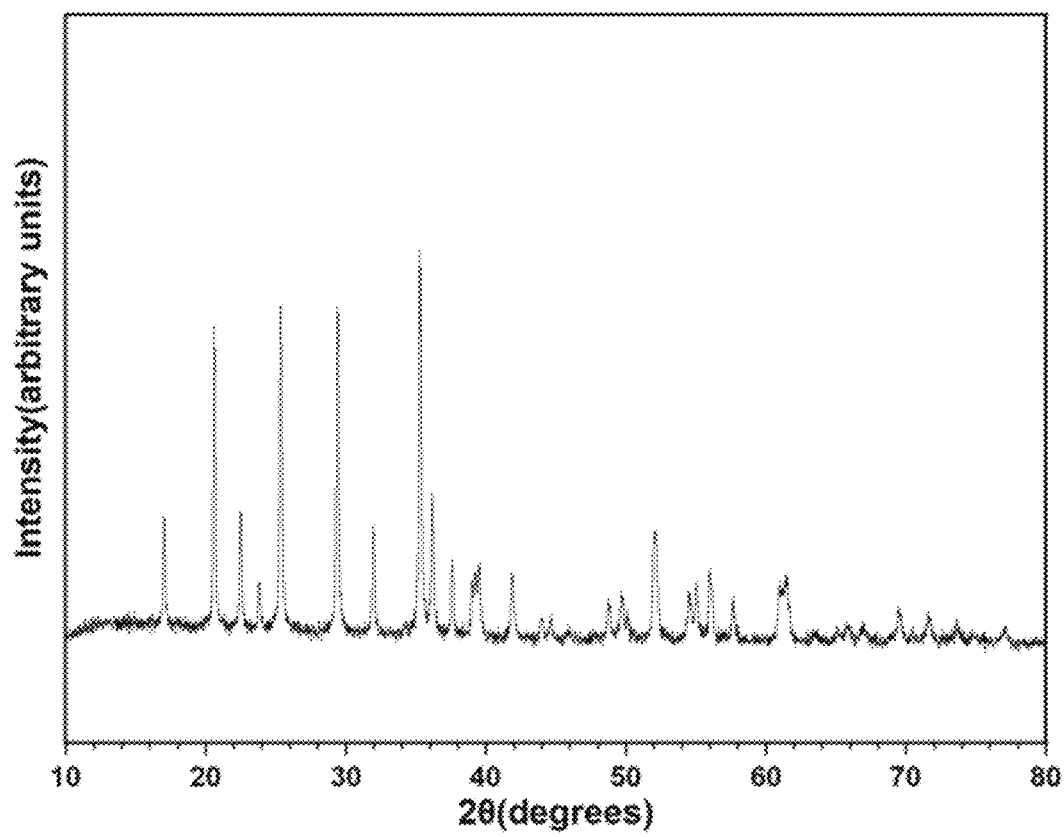
FIG. 7 is an XRD pattern of the lithium manganese iron phosphate cathode material prepared by Example 2.

The prepared lithium manganese iron phosphate cathode material is tested by XRD, the test results are shown in FIG. 7, it can be seen from the figure that the synthesized material is pure-phase lithium manganese iron phosphate and has good crystallinity.

Figure 8:
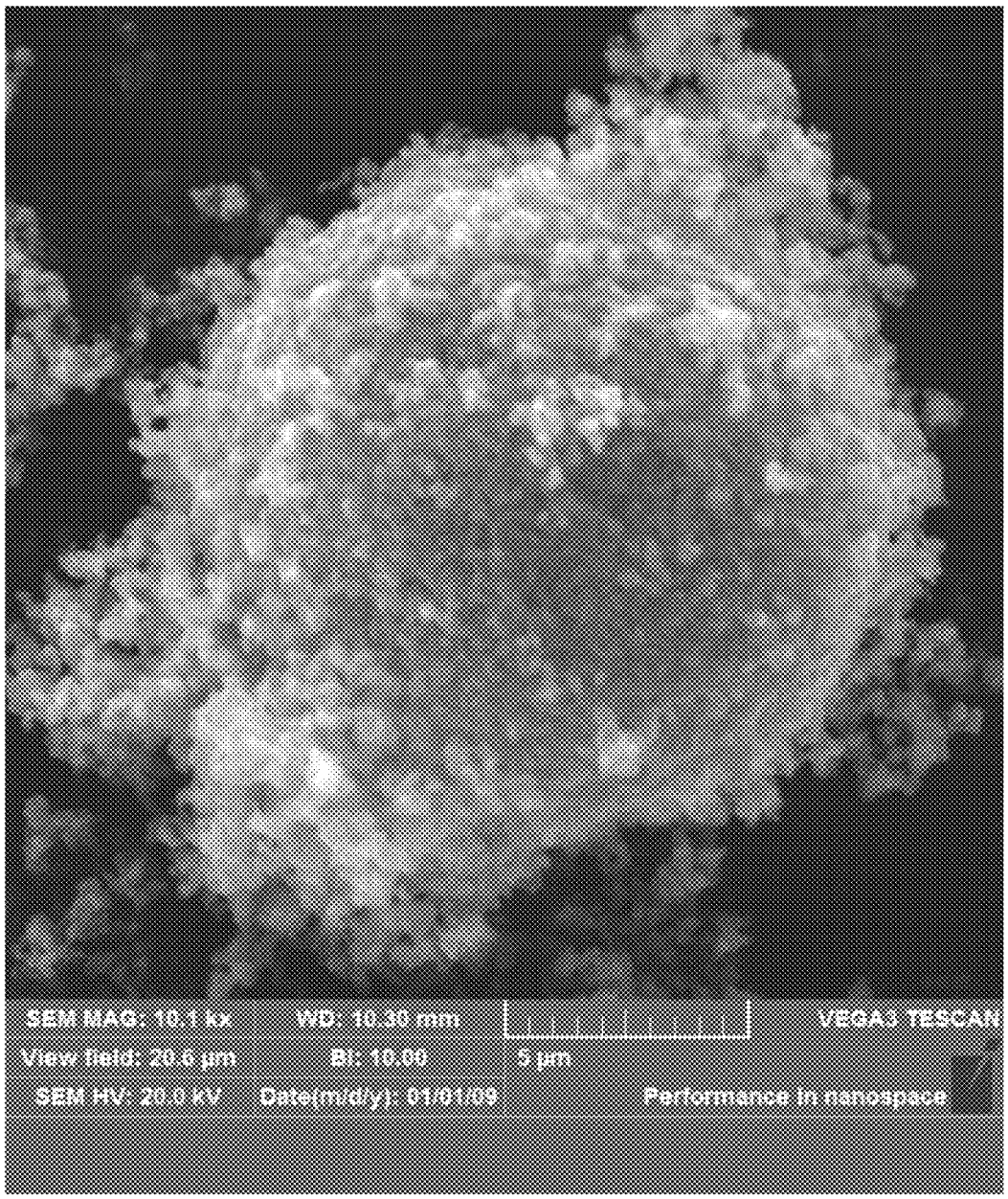
FIG. 8 is an SEM image of the lithium manganese iron phosphate cathode material prepared by Example 2.

The prepared lithium manganese iron phosphate cathode material is tested by SEM, the test results are shown in FIG. 8, it can be seen from the figure that the morphology of lithium manganese iron phosphate particles is spherical and the size is small.

Figure 9:
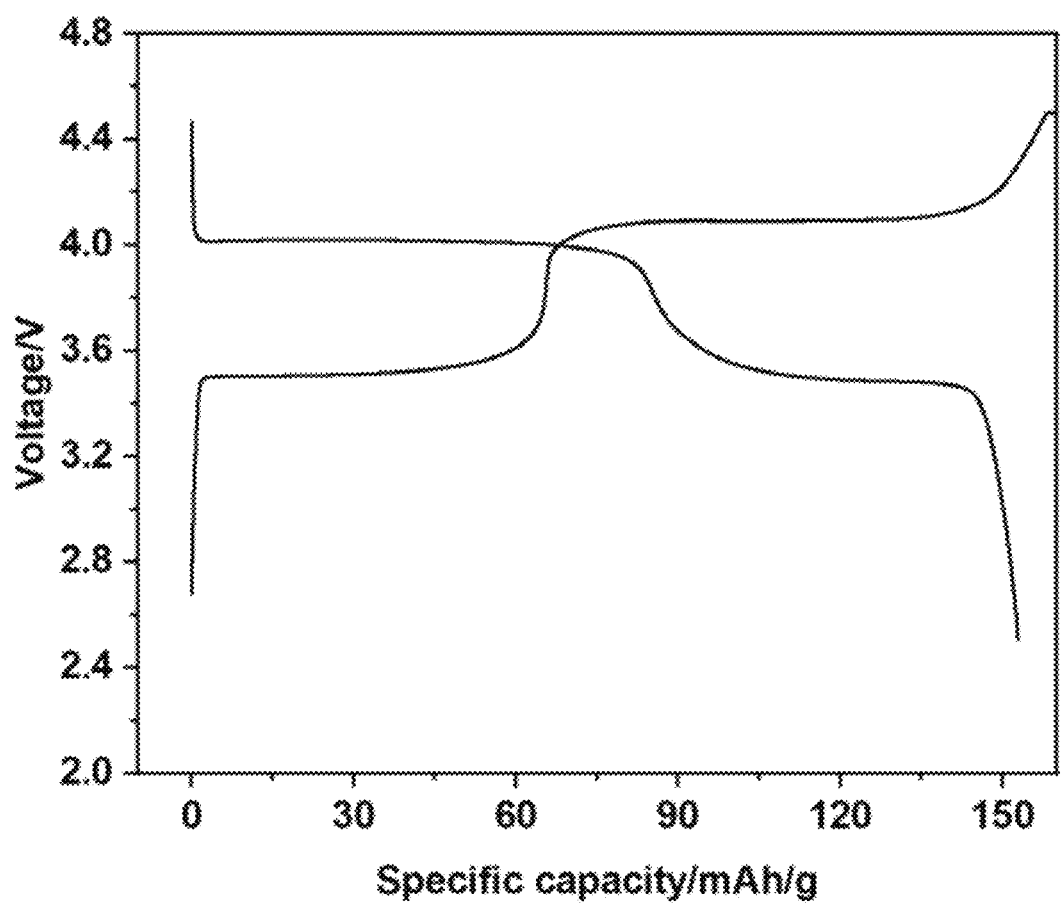
FIG. 9 is a charge-discharge curve at 0.1 C of the lithium manganese iron phosphate cathode material prepared by Example 2.

The electrochemical performance of the prepared lithium manganese iron phosphate cathode material is tested, the test results are shown in FIG. 9, it can be seen from the figure that the material has a discharge specific capacity of 152.9 mAh/g at 0.1 C rate, and the performance is excellent.

Example 3

A preparation method for the lithium manganese iron phosphate cathode material includes the following steps:

Step 1, 8.9735 g of $MnCl_2$ and 1638.5510 g of $FeCl_2$ are weighed to prepare 20 L of 0.5 mol/L Mn, Fe metal mixed salt solution, Mn:Fe=1:99, 53.4915 g of ammonia chloride is added as the first complexing agent, 3.2950 g of citric acid is added as an antioxidant, and stirred evenly;

Step 2, air is introduced into the reactor, and the mixed salt solution of manganese and iron and ammonia water are added into the reactor containing deionized water, the pH value of the reaction system is controlled to 11.0 with 10 mol/L NaOH solution, and the reaction temperature is 90° C., after the reaction, the precipitate is filtered and washed 3 times with deionized water at 90° C., and the filter cake is collected, the filter cake is placed in a blast drying oven at 160° C. for 10 h, and then the material is taken out and sieved to obtain the manganese iron oxide powder;

Step 3, 10 g of manganese iron oxide powder is weighed according to the stoichiometric ratio:manganese+iron:lithium:phosphorus=0.95:0.95:1.05, 4.4119 g of $Li_2CO_3$ is added as lithium source, and 12.9356 g of $H_3PO_4$ as phosphorus source, 3.57 g of sucrose is added as lithium source, 40 mL of ethanol is added as dispersant, the ratio of ball to material is 40:1, the ball milling medium is zirconia ball, the ball milling time is 6 h, the slurry after ball milling is processed by blast drying at 90° C. for 12 h and sieved;

Step 4, the mixed powder obtained in Step 3 is placed in a magnesium oxide crucible, and then placed in a tube furnace, in a nitrogen atmosphere, the temperature is raised to 400° C. and kept for 3 h for pre-sintering, and then the temperature is raised to 800° C. and calcined for 5 h, after cooling to 25° C. with the furnace, the nano-$LiMn_{0.01}Fe_{0.99}PO_4$ cathode material is obtained.

Figure 10:
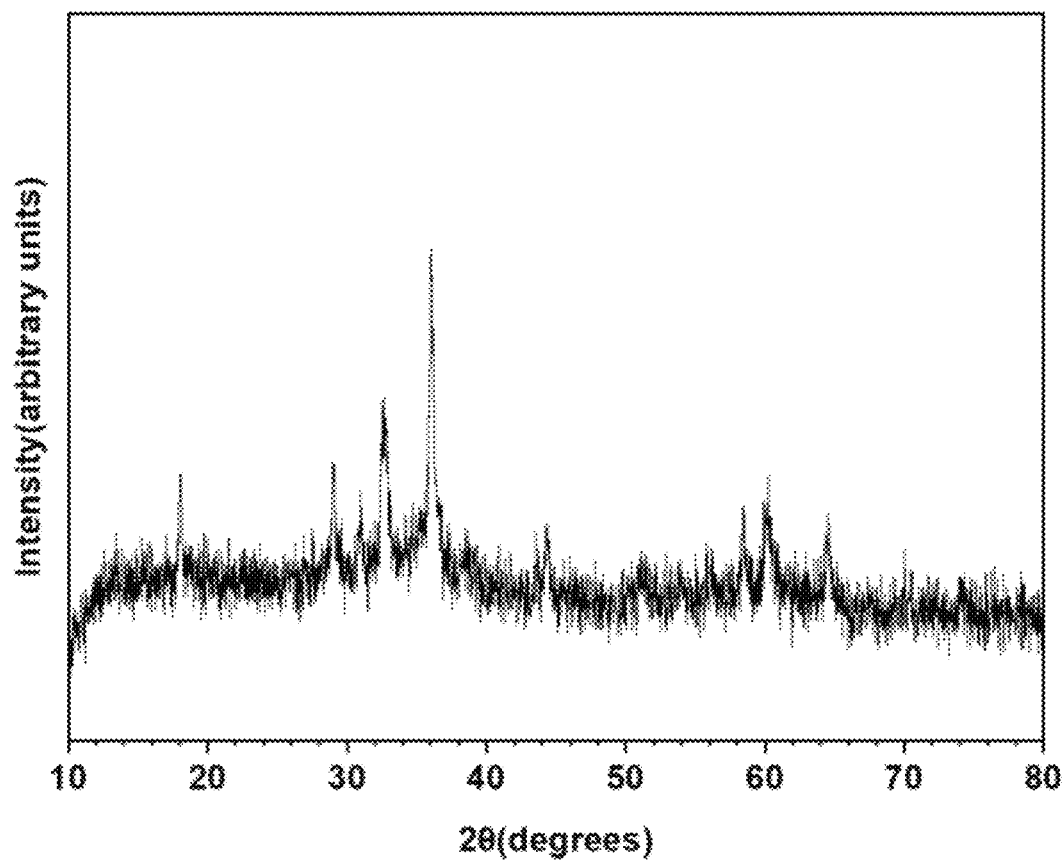
FIG. 10 is an XRD pattern of manganese iron oxide prepared by Example 3.

The prepared manganese iron oxide is tested by XRD, and the test results are shown in FIG. 10, it can be seen from the figure that the crystallinity of the synthesized material is better.

Figure 11:
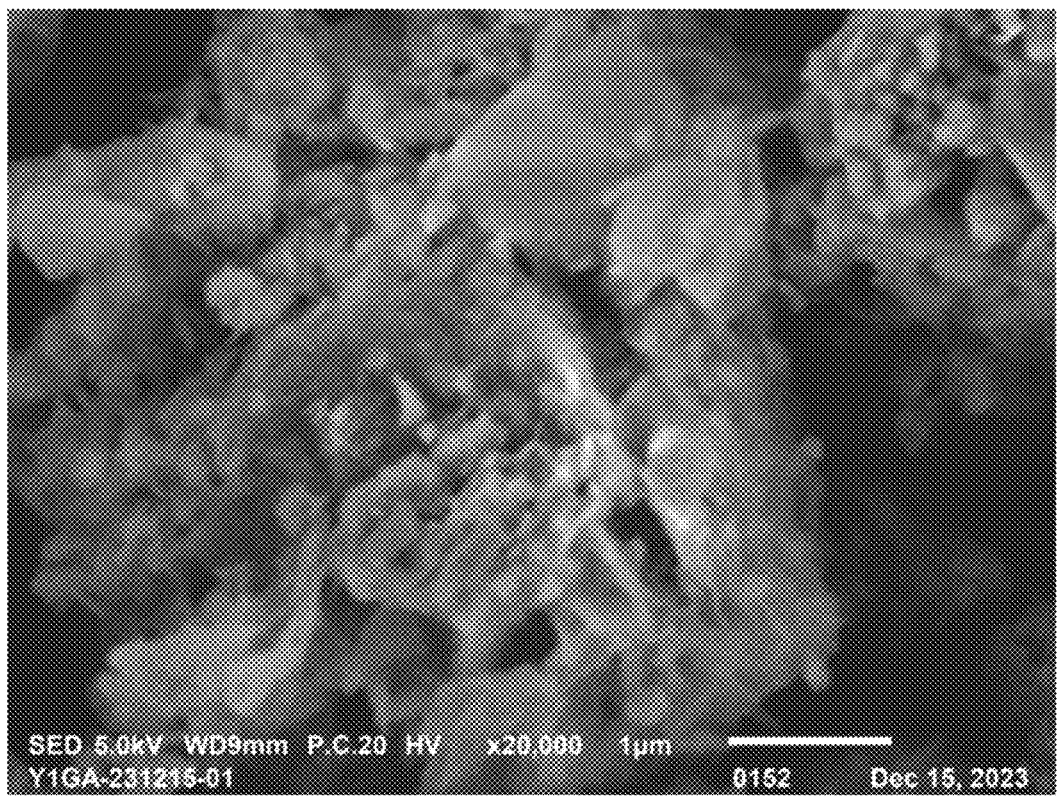
FIG. 11 is a SEM image of manganese iron oxide prepared by Example 3.

The prepared manganese iron oxide is tested by SEM, and the test results are shown in FIG. 11, it can be seen from the figure that the primary particle morphology of the synthesized material is a flake and the size is a micron.

Figure 12:
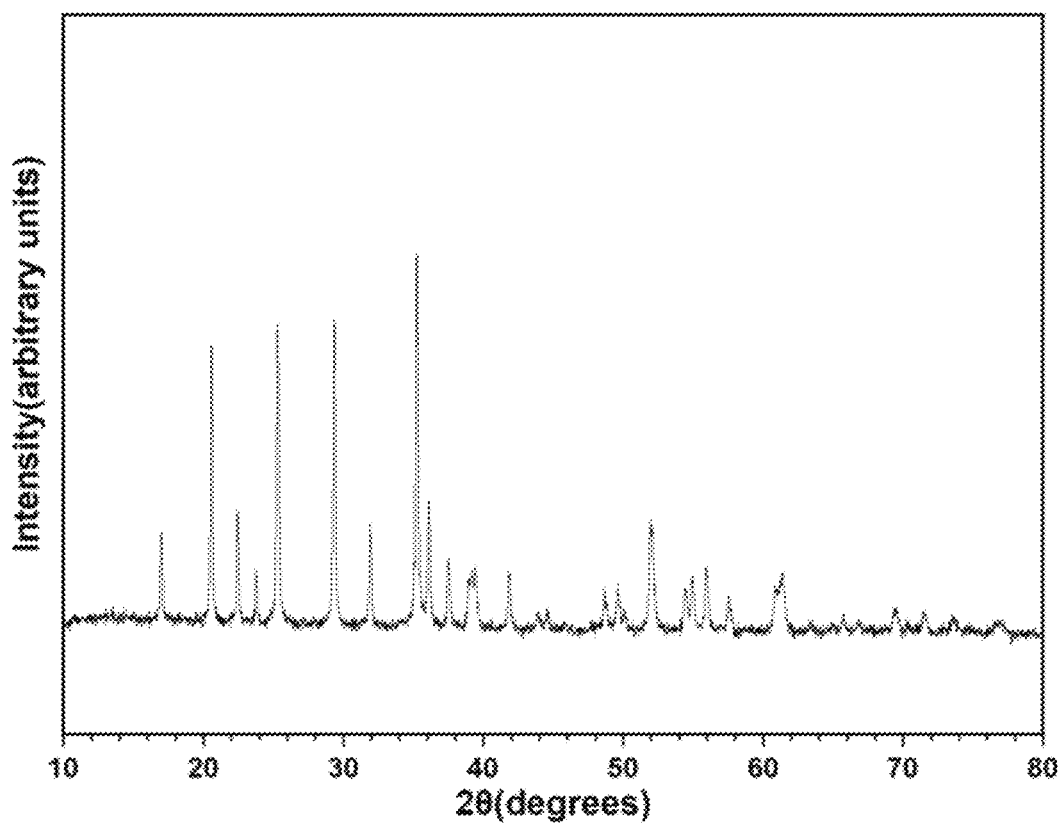
FIG. 12 is an XRD diagram of the lithium manganese iron phosphate cathode material prepared by Example 3.

The prepared lithium manganese iron phosphate cathode material is tested by XRD, and the test results are shown in FIG. 12, it can be seen from the figure that the synthesized material is pure-phase lithium manganese iron phosphate and has good crystallinity.

Figure 13:
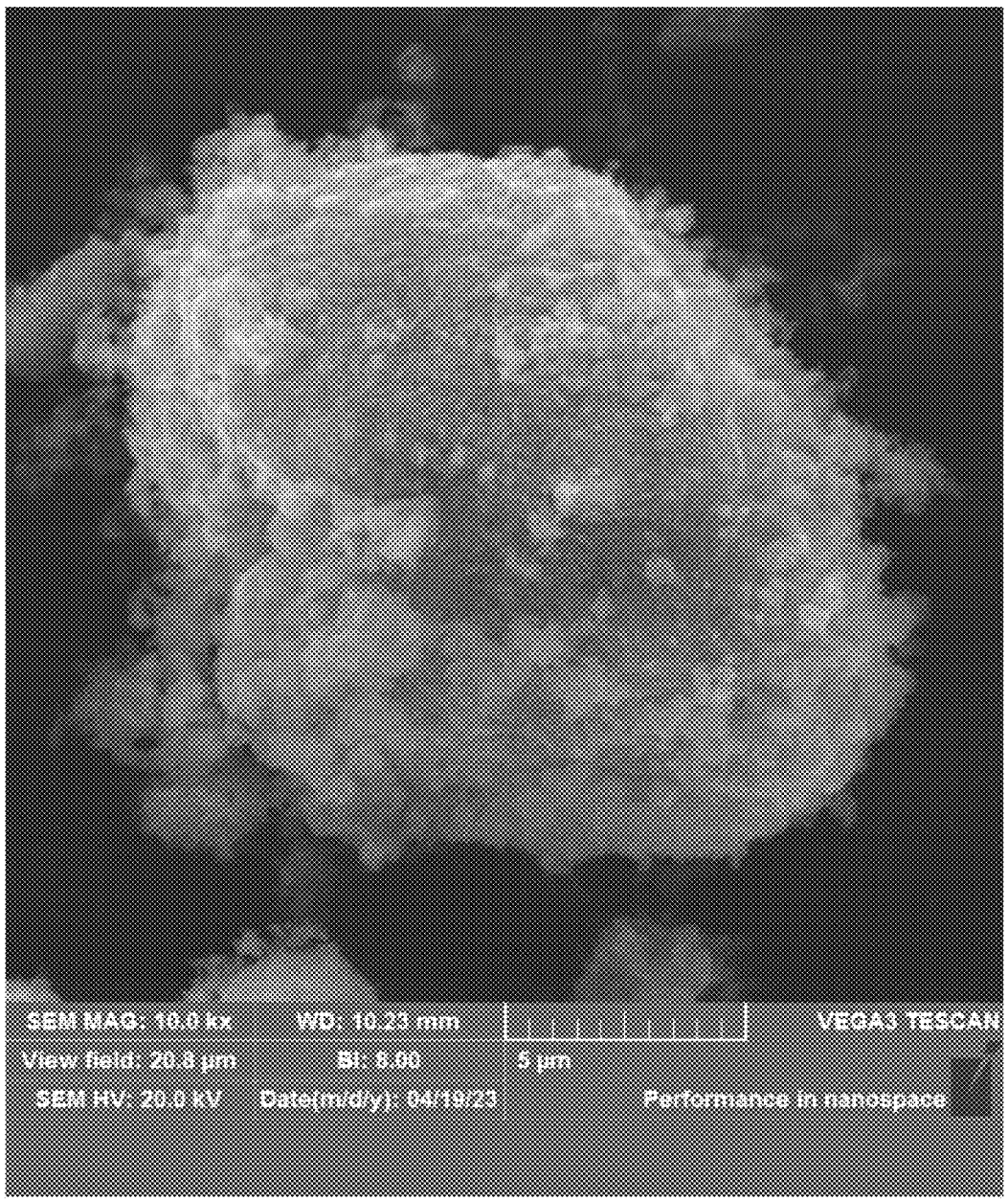
FIG. 13 is a SEM diagram of the lithium manganese iron phosphate cathode material prepared by Example 3.

The prepared lithium manganese iron phosphate cathode material is tested by SEM, and the test results are shown in FIG. 13, it can be seen from the figure that the morphology of lithium manganese iron phosphate particles is spherical.

Figure 14:
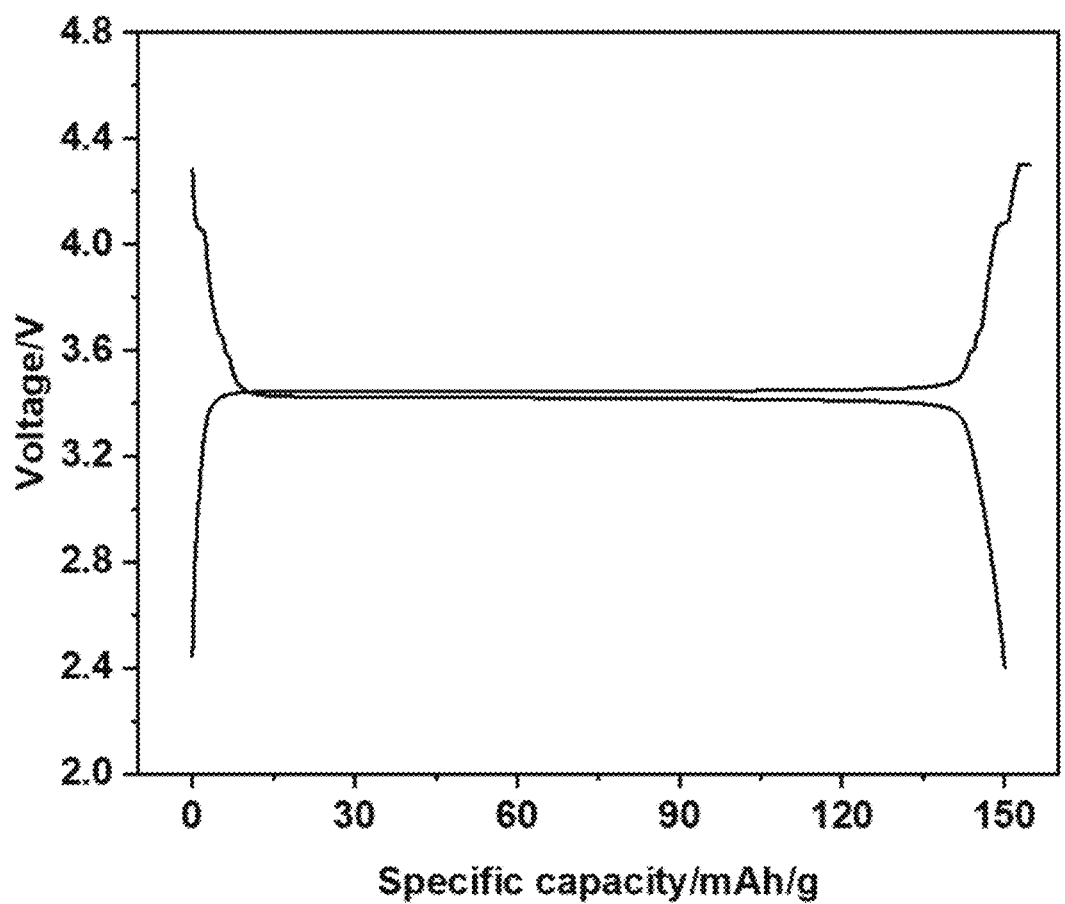
FIG. 14 shows a charge-discharge curve at 0.2 C of the lithium manganese iron phosphate cathode material prepared by Example 3.

The electrochemical performance of the prepared lithium manganese iron phosphate cathode material is tested, the test results are shown in FIG. 14, it can be seen from the figure that the material has a discharge specific capacity of 150.1 mAh/g at 0.2 C rate, and the performance is excellent.

Although the present invention has been described above in conjunction with exemplary embodiments, it should be clear to technicians in the field that the exemplary embodiments of the present invention can be modified and altered without departing from the spirit and scope defined by the claims.

What is claimed is:

1. A method for preparing a manganese iron oxide, comprising the following steps:
configuring a mixed salt solution containing a first complexing agent, an antioxidant, a manganese salt, and an iron salt, wherein the first complexing agent is at least one of ethylenediaminetetraacetic acid disodium, diethanolamine, and diethylenetriamine, an addition amount of the first complexing agent is 0.1-10% of a total amount of manganese and iron; the antioxidant is at least one of ascorbic acid and citric acid;

mixing the mixed salt solution, a second complexing agent, an oxidant, and deionized water to undergo a complexation-oxidation-precipitation reaction to an end of the complexation-oxidation-precipitation reaction, filtering, washing, and drying a precipitate obtained after the complexation-oxidation-precipitation reaction to obtain the manganese iron oxide, wherein the second complexing agent is at least one of ethylenediaminetetraacetic acid (EDTA), ammonia, and citric acid, a feed rate of the second complexing agent records as 0.2-5 times of a feed molar flow rate of the mixed salt solution; a pH value of a reaction system is 8.0-11.0, a reaction temperature is 30° C.-90° C., a reaction time is 8 h-100 h, and a concentration of the second complexing agent is 1 mol/L-14 mol/L; the oxidant is at least one of $O_2$, $H_2O_2$, and air;

the manganese iron oxide is composed of spherical or quasi-spherical secondary particles, the spherical or quasi-spherical secondary particles are formed by an aggregation of primary particles in a form of flakes, a chemical formula of the manganese iron oxide is $Mn_{3-x}Fe_xO_4$, wherein 0<x<3.

2. The method for preparing the manganese iron oxide according to claim 1, wherein a sum of a concentration of the manganese and a concentration of the iron in the mixed salt solution is 0.5 mol/L-2 mol/L.

3. The method for preparing the manganese iron oxide according to claim 1, wherein the iron salt is at least one of $FeSO_4 \cdot 7H_2O$, $FeSO_4$, $FeCl_2$, $FeCl_2 \cdot 4H_2O$, and iron acetate; the manganese salt is at least one of $MnSO_4$, $MnSO_4 \cdot H_2O$, $Mn(NO_3)_2$, $MnCl_2$, $MnCl_2 \cdot 4H_2O$, and manganese acetate;
and a mass of the antioxidant is 0.1-0.2% of a total mass of the manganese salt and the iron salt.

4. The method for preparing the manganese iron oxide according to claim 1, wherein a secondary particle size is 1 μm-15 μm; a molar ratio of the manganese to the iron is (1-99):1.

5. A preparation method for a lithium manganese iron phosphate cathode material, comprising the following steps:
mixing the manganese iron oxide prepared by the method for preparing the manganese iron oxide according to claim 1 with a lithium source, a phosphorus source, and a carbon source, and calcining in an inert atmosphere to obtain a carbon-coated lithium manganese iron phosphate cathode material.

6. The preparation method for the lithium manganese iron phosphate cathode material according to claim 5, wherein the calcination comprises heat preservation at 300° C.-400° C. for 3 h-10 h and then calcining at 600° C.-800° C. for 5 h-10 h;
the lithium source is at least one of LiOH, $LiNO_3$, $Li_2CO_3$, and $LiH_2PO_4$;
the phosphorus source is at least one of $LiH_2PO_4$, $H_3PO_4$, and $NH_4H_2PO_4$;
the carbon source is at least one of starch, polyvinyl alcohol (PVA), sucrose, citric acid, and glucose.

7. The preparation method for the lithium manganese iron phosphate cathode material according to claim 5, wherein a stoichiometric ratio of each substance is Mn+Fe:Li:P=(0.95-1):(0.95-1.05):(0.95-1.05); an amount of the carbon source added is a sum of an atomic weight of the manganese and an atomic weight of the iron, 1 mol of the manganese and the iron is added to 5-30 g of the carbon source.

8. The method for preparing the manganese iron oxide according to claim 2, wherein the iron salt is at least one of $FeSO_4 \cdot 7H_2O$, $FeSO_4$, $FeCl_2$, $FeCl_2 \cdot 4H_2O$, and iron acetate; the manganese salt is at least one of $MnSO_4$, $MnSO_4 \cdot H_2O$, $Mn(NO_3)_2$, $MnCl_2$, $MnCl_2 \cdot 4H_2O$, and manganese acetate;

and a mass of the antioxidant is 0.1-0.2% of a total mass of the manganese salt and the iron salt.

9. The method for preparing the manganese iron oxide according to claim 2, wherein a secondary particle size is 1 μm-15 μm; a molar ratio of the manganese to the iron is (1-99):1.

10. The preparation method for the lithium manganese iron phosphate cathode material according to claim 5, wherein in the method for preparing the manganese iron oxide, a sum of a concentration of the manganese and a concentration of the iron in the mixed salt solution is 0.5 mol/L-2 mol/L.

11. The preparation method for the lithium manganese iron phosphate cathode material according to claim 5, wherein in the method for preparing the manganese iron oxide, the iron salt is at least one of $FeSO_4 \cdot 7H_2O$, $FeSO_4$, $FeCl_2$, $FeCl_2 \cdot 4H_2O$, and iron acetate; the manganese salt is at least one of $MnSO_4$, $MnSO_4 \cdot H_2O$, $Mn(NO_3)_2$, $MnCl_2$, $MnCl_2 \cdot 4H_2O$, and manganese acetate;

and a mass of the antioxidant is 0.1-0.2% of a total mass of the manganese salt and the iron salt.

12. The preparation method for the lithium manganese iron phosphate cathode material according to claim 5, wherein in the method for preparing the manganese iron oxide, a secondary particle size is 1 μm-15 μm; a molar ratio of the manganese to the iron is (1-99):1.

13. The preparation method for the lithium manganese iron phosphate cathode material according to claim 10, wherein in the method for preparing the manganese iron oxide, the iron salt is at least one of $FeSO_4 \cdot 7H_2O$, $FeSO_4$, $FeCl_2$, $FeCl_2 \cdot 4H_2O$, and iron acetate; the manganese salt is at least one of $MnSO_4$, $MnSO_4 \cdot H_2O$, $Mn(NO_3)_2$, $MnCl_2$, $MnCl_2 \cdot 4H_2O$, and manganese acetate;

and a mass of the antioxidant is 0.1-0.2% of a total mass of the manganese salt and the iron salt.

14. The preparation method for the lithium manganese iron phosphate cathode material according to claim 10, wherein in the method for preparing the manganese iron oxide, a secondary particle size is 1 μm-15 μm; a molar ratio of the manganese to the iron is (1-99):1.

15. The preparation method for the lithium manganese iron phosphate cathode material according to claim 6, wherein a stoichiometric ratio of each substance is Mn+Fe:Li:P=(0.95-1):(0.95-1.05):(0.95-1.05); an amount of the carbon source added is a sum of an atomic weight of the manganese and an atomic weight of the iron, 1 mol of the manganese and the iron is added to 5-30 g of the carbon source.

16. The preparation method for the lithium manganese iron phosphate cathode material according to claim 10, wherein the calcination comprises heat preservation at 300° C.-400° C. for 3 h-10 h and then calcining at 600° C.-800° C. for 5 h-10 h;

the lithium source is at least one of LiOH, $LiNO_3$, $Li_2CO_3$, and $LiH_2PO_4$;

the phosphorus source is at least one of $LiH_2PO_4$, $H_3PO_4$, and $NH_4H_2PO_4$;

the carbon source is at least one of starch, PVA, sucrose, citric acid, and glucose.

17. The preparation method for the lithium manganese iron phosphate cathode material according to claim 11, wherein the calcination comprises heat preservation at 300° C.-400° C. for 3 h-10 h and then calcining at 600° C.-800° C. for 5 h-10 h;

the lithium source is at least one of LiOH, $LiNO_3$, $Li_2CO_3$, and $LiH_2PO_4$;

the phosphorus source is at least one of $LiH_2PO_4$, $H_3PO_4$, and $NH_4H_2PO_4$;

the carbon source is at least one of starch, PVA, sucrose, citric acid, and glucose.

18. The preparation method for the lithium manganese iron phosphate cathode material according to claim 12, wherein the calcination comprises heat preservation at 300° C.-400° C. for 3 h-10 h and then calcining at 600° C.-800° C. for 5 h-10 h;

the lithium source is at least one of LiOH, $LiNO_3$, $Li_2CO_3$, and $LiH_2PO_4$;

the phosphorus source is at least one of $LiH_2PO_4$, $H_3PO_4$, and $NH_4H_2PO_4$;

the carbon source is at least one of starch, PVA, sucrose, citric acid, and glucose.

19. The preparation method for the lithium manganese iron phosphate cathode material according to claim 13, wherein the calcination comprises heat preservation at 300° C.-400° C. for 3 h-10 h and then calcining at 600° C.-800° C. for 5 h-10 h;

the lithium source is at least one of LiOH, $LiNO_3$, $Li_2CO_3$, and $LiH_2PO_4$;

the phosphorus source is at least one of $LiH_2PO_4$, $H_3PO_4$, and $NH_4H_2PO_4$;

the carbon source is at least one of starch, PVA, sucrose, citric acid, and glucose.

20. The preparation method for the lithium manganese iron phosphate cathode material according to claim 14, wherein the calcination comprises heat preservation at 300° C.-400° C. for 3 h-10 h and then calcining at 600° C.-800° C. for 5 h-10 h;

the lithium source is at least one of LiOH, $LiNO_3$, $Li_2CO_3$, and $LiH_2PO_4$;

the phosphorus source is at least one of $LiH_2PO_4$, $H_3PO_4$, and $NH_4H_2PO_4$;

the carbon source is at least one of starch, PVA, sucrose, citric acid, and glucose.

* * * * *